Patented Oct. 17, 1939

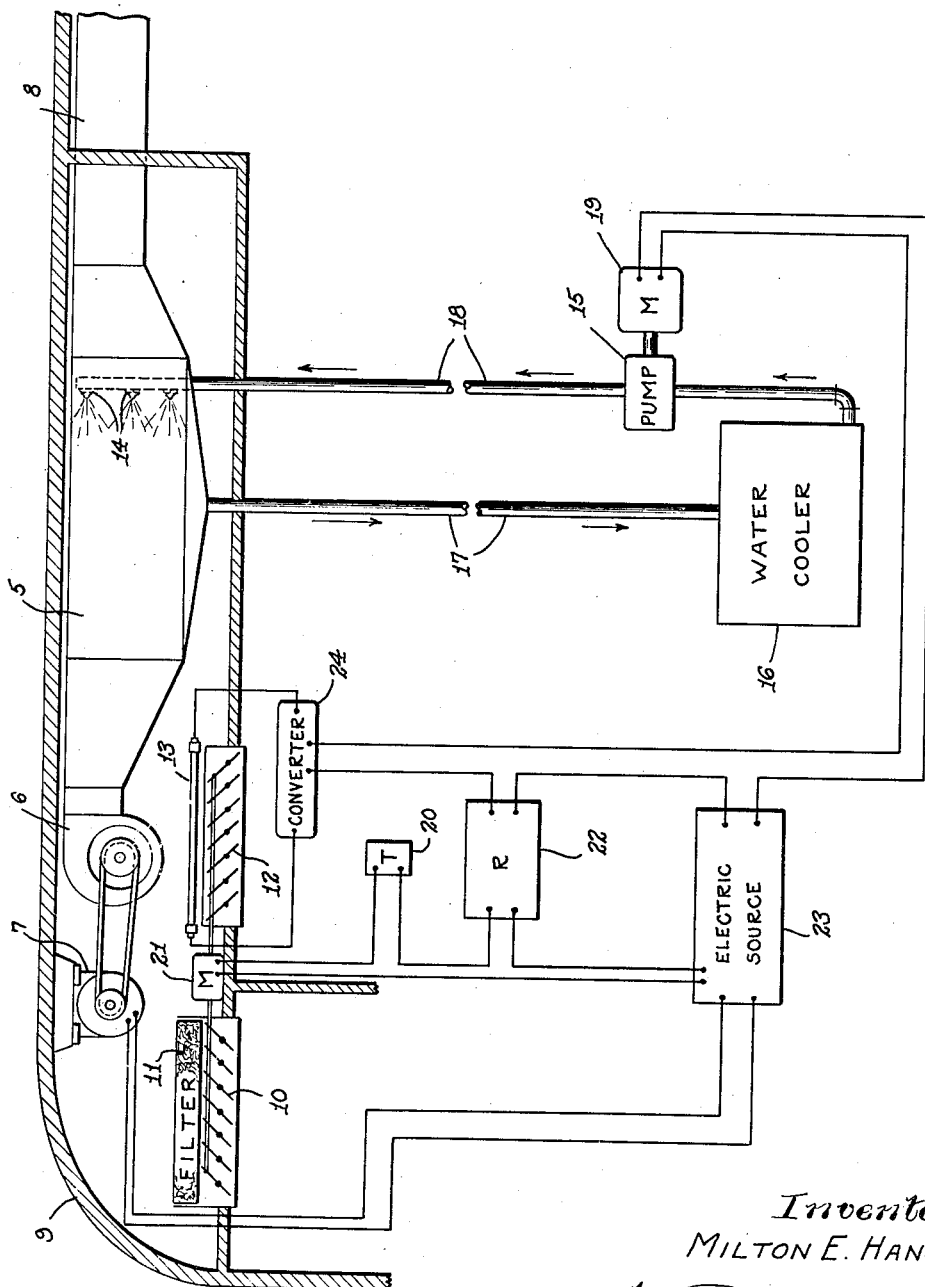

2,176,841

UNITED STATES PATENT OFFICE 2,176,841

AIR COOLING SYSTEM FOR PASSENGER VEHICLES

Milton E. Hanson, Haddonfield, N. J., assignor to B. F. Sturtevant Company, Hyde Park, Boston, Mass.

Application April 27, 1938, Serial No. 204,615

3 Claims. (Cl. 62—6)

This invention relates to the cooling of air and relates more particularly to the cooling of the air of passenger vehicles by refrigeration.

This invention provides an efficient, inexpensive system for supplying cool, pure air to passenger vehicles such for example as railway passenger cars. The system combines cooling by refrigeration with pressure ventilation utilizing all outdoor air during the off-cooling cycles. During the cooling cycles, a mixture of outdoor and recirculated air is washed with refrigerated water. The recirculated air prior to cooling is irradiated with concentrated ultra-violet to remove bacteria. During the off-cooling cycles, all outdoor air which is relatively pure is supplied into the passenger space with the air washer and air sterilizer shut down for operating economy.

An object of the invention is to supply cool, germ free air into a passenger vehicle.

Another object of the invention is to provide an efficient, relatively inexpensive, air cooling and air purifying system for passenger vehicles.

Other objects of the invention will be apparent from the following description taken together with the drawing.

The invention will now be described with reference to the drawing which illustrates diagrammatically one embodiment of the invention.

The air washer 5, blower 6, blower motor 7 and air supply duct 8 are located in the roof zone of the car 9.

The blower 7 draws outdoor air between the dampers 10 and through the filter 11, and draws recirculated air from the passenger space, between the dampers 12 and over the ultra-violet lamp 13, and forces the mixed outdoor and recirculated air through the washer 5 and then through the duct 8 for distribution in the passenger space.

The washer 5 contains the spray nozzles 14. Cold water from the water cooler 16 is supplied by the pump 15, through the pipe to the nozzles 14. The drain water from the washer 5 flows back through the pipe 17 to the water cooler 16 for recooling.

The water cooler 16 may be of any well known type and the water may be cooled by the evaporator coils of any well known refrigerating system, or by ice.

The thermostat 20 in the passenger space, controls the air conditions therein by controlling the operation of pump motor 19, the converter 24 supplying electrical current to the ultra-violet lamp 13, and the damper motor 21.

When the temperature in the passenger space is at or above a predetermined point, say 75° F., for example, the thermostat 20 closes its contacts to close an electric circuit including the damper motor 21, the solenoid winding of the relay 22 and the electric source 23. The motor 21 is energized to move the dampers 10 and 12 to 25% outdoor and 75% recirculated air. The solenoid of the relay 22 is energized and closes its contacts which are in the circuit including the converter 24, the electric source 23 and the pump motor 19. This causes the converter to energize the ultra-violet lamp 21, and the motor 19 to drive the pump 15.

The blower 6, the motor 7 of which is continuously energized by the electric source 23, then draws in outdoor and recirculated air and passes it through the washer. The spray nozzles 14 in the washer 5 are supplied with refrigerated water by the pump 15.

The lamp 13 irradiates the recirculated air and destroys the bacteria carried thereby. The sprays in the washer 5, wash down the dead bacteria and otherwise clean, purify and freshen the air as well as cool it.

When the temperature of the air within the passenger space has been cooled by the action of the washer 5, below 75° F., the thermostat 20 opens its contacts and deenergizes the relay 22 and damper motor 21. The deenergization of the relay causes it to open its contacts to deenergize the motor 19 and the converter 24.

The damper motor adjusts the dampers 10 and 12 to 100% outdoor air. The ultra-violet lamp 13 is deenergized and the pump 15 stops so that the sprays in the washer 5 are discontinued. All this results in 100% outdoor air being supplied in a pressure ventilating cycle, into the car. The outdoor air is fresh and relatively pure so that it does not require irradiation and washing. During a large portion of the time, it will maintain the desired temperature in the car, but when it does not, the thermostat 20 automatically goes into action to supply refrigeration.

While one embodiment of the invention has been described for the purpose of illustration, it should be understood that the invention is not limited to the exact arrangement described, since many departures will suggest themselves to those skilled in the art, after having had access to this disclosure.

What is claimed is:

1. An air cooling system for a passenger vehicle comprising an air cooling unit, means for circulating a refrigerating fluid through said unit for producing an air cooling effect, means for supplying outdoor and recirculated air to said unit, volume control means for varying the proportion of outdoor to recirculated air supplied by said last mentioned means to said unit, means for energizing and deenergizing said circulating means, and thermostatic means responsive to temperatures within the passenger space of said vehicle for actuating said last mentioned means and said volume control means to deenergize said circulating means and to increase the proportion of outdoor air for temperatures below a predetermined point, and to energize said circulating means and to increase the proportion of recirculated air for temperatures above said point.

2. An air cooling system for a passenger vehicle comprising an air washer, a source of refrigerated water, a pump for supplying water from said source to said washer, means for supplying outdoor and recirculated air to said washer, volume control means for varying the proportion of outdoor to recirculated air supplied by said last mentioned means, means for energizing and deenergizing said pump, and means responsive to temperatures within the passenger space of said vehicle for actuating said last mentioned means and said volume control means to deenergize said pump and to increase the proportion of outdoor air supplied to said washer when the temperature of the air in the passenger space is below a predetermined point, and to energize said pump and to increase the proportion of recirculated air supplied to said washer when the temperature of the air within the passenger space is above said point.

3. An air cooling system for a passenger vehicle comprising an air washer, a source of refrigerated water, a pump for supplying water from said source to said washer, means for supplying outdoor and recirculated air to said washer, volume control means for varying the proportion of outdoor to recirculated air supplied by said last mentioned means, means for energizing and deenergizing said pump, and means responsive to temperatures within the passenger space of said vehicle for actuating said last mentioned means and said volume control means to deenergize said pump and to discontinue the supply of recirculated air to said washer when the temperature of the air in the passenger space is below a predetermined point, and to energize said pump and to again supply recirculated air to said washer when the temperature of the air within the passenger space is above said point.

MILTON E. HANSON.